US009125138B2

(12) United States Patent
Abuan et al.

(10) Patent No.: US 9,125,138 B2
(45) Date of Patent: Sep. 1, 2015

(54) SYSTEM AND METHOD FOR OPTIMIZING VIDEO CONFERENCING IN A WIRELESS DEVICE

(71) Applicant: Apple Inc., Cupertino, CA (US)

(72) Inventors: Joe S. Abuan, Cupertino, CA (US); Xiaosong Zhou, Campbell, CA (US); Sundararaman V. Shiva, Los Gatos, CA (US); Hsi-Jung Wu, San Jose, CA (US); Yan Yang, San Jose, CA (US); Hyeonkuk Jeong, Saratoga, CA (US); James O. Normile, Los Altos, CA (US); Chris Y. Chung, Sunnyvale, CA (US); Roberto Garcia, Santa Clara, CA (US); Thomas C. Jansen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 374 days.

(21) Appl. No.: 13/663,005

(22) Filed: Oct. 29, 2012

(65) Prior Publication Data

US 2013/0222515 A1     Aug. 29, 2013

Related U.S. Application Data

(60) Provisional application No. 61/605,082, filed on Feb. 29, 2012.

(51) Int. Cl.
*H04W 40/00* (2009.01)
*H04W 40/12* (2009.01)
*H04N 7/14* (2006.01)
*H04L 12/725* (2013.01)
*H04W 72/04* (2009.01)
*H04W 40/06* (2009.01)
*H04L 12/721* (2013.01)

(52) U.S. Cl.
CPC ............. *H04W 40/12* (2013.01); *H04L 45/306* (2013.01); *H04N 7/14* (2013.01); *H04L 45/70* (2013.01); *H04W 40/06* (2013.01); *H04W 72/046* (2013.01)

(58) Field of Classification Search
CPC ........ H04W 4/02–4/046; H04W 24/00–24/08; H04W 28/0231–28/0263; H04W 28/08–28/085; H04W 28/10–28/14; H04W 36/06–36/385; H04W 40/00–40/38; H04W 48/00–48/20; H04W 76/04–76/048
USPC .................... 348/14.01–14.16; 370/229–240, 370/259–271, 310–357; 709/201–207, 709/217–248
See application file for complete search history.

(56) References Cited

U.S. PATENT DOCUMENTS 6,141,560 A * 10/2000 Gillig et al. ................. 455/553.1
6,917,820 B2 * 7/2005 Gore et al. .................. 455/562.1
7,463,622 B2 * 12/2008 Lu et al. ........................ 370/352

(Continued)

FOREIGN PATENT DOCUMENTS

WO    2012053651    4/2012

*Primary Examiner* — Hemant Patel
(74) *Attorney, Agent, or Firm* — Meyertons, Hood, Kivlin, Kowert & Goetzel, P.C.; Erik A. Heter

(57) ABSTRACT

A wireless device described herein can use information on data flow, in addition to indications from the physical network, to decide on suitable bandwidth usage for audio and video information. This data flow information is further used to determine an efficient network route to use for high-quality reception and transmission of audio and video data, as well as the appropriate time to switch between available network routes to improve bandwidth performance.

20 Claims, 8 Drawing Sheets

(56) References Cited

U.S. PATENT DOCUMENTS

| | | |
|---|---|---|
| 7,664,036 B2 * | 2/2010 | Bye .............................. 370/237 |
| 8,744,375 B2 * | 6/2014 | Raghuraman ................. 455/101 |
| 2004/0119814 A1 | 6/2004 | Clisham et al. |
| 2004/0233841 A1 * | 11/2004 | Sanada et al. ................ 370/210 |
| 2005/0090205 A1 * | 4/2005 | Catreux-Erceg et al. ....... 455/78 |
| 2005/0159153 A1 * | 7/2005 | Mousseau et al. ......... 455/432.1 |
| 2007/0066244 A1 * | 3/2007 | Kao et al. ........................ 455/78 |
| 2007/0093282 A1 * | 4/2007 | Chang et al. ................ 455/575.7 |
| 2009/0116443 A1 | 5/2009 | Walker et al. |
| 2009/0258672 A1 * | 10/2009 | Camp et al. ................. 455/553.1 |
| 2010/0246547 A1 * | 9/2010 | Yoon .............................. 370/338 |
| 2010/0316027 A1 * | 12/2010 | Rick et al. ..................... 370/336 |
| 2011/0316965 A1 | 12/2011 | Moore et al. |
| 2012/0086767 A1 | 4/2012 | Lau et al. |

* cited by examiner

SYSTEM AND METHOD FOR OPTIMIZING VIDEO CONFERENCING IN A WIRELESS DEVICE

PRIORITY CLAIM

This application claims benefit of priority to U.S. Provisional Application No. 61/605,082 entitled "System and Method for Optimizing Video Conferencing in a Wireless Device" and filed on Feb. 29, 2012, and which is hereby incorporated by reference in its entirety.

TECHNICAL FIELD

This disclosure relates to data communications, and more particularly, to a method for managing performance of audio and/or video conferencing in varying network conditions.

DESCRIPTION OF THE RELATED TECHNOLOGY

Handheld electronic devices are becoming increasingly popular. Examples of handheld devices include handheld computers, cellular telephones, media players, and hybrid devices that include the functionality of multiple devices of this type.

Due in part to their mobile nature, handheld electronic devices are often provided with wireless communications capabilities. Handheld electronic devices may use long-range wireless communications to communicate with wireless base stations. For example, cellular telephones may communicate using cellular telephone bands at 850 MHz, 900 MHz, 1800 20 MHz, and 1900 MHz. Handheld electronic devices may also use short-range wireless communications links For example, handheld electronic devices may communicate using the WiFi® (IEEE 802.11) band at 2.4 GHz and the Bluetooth® band at 2.4 GHz. Communications are also possible in data service 25 bands such as the 3G data communications band at 2170 MHz (commonly referred to as the UMTS or Universal Mobile Telecommunications System band). Because of the various wireless frequencies used by each band, communication links within each device can use one or more antennas.

One application of handheld electronic devices is videoconferencing, which can be performed in conjunction with an electronic device, handheld or otherwise. Videoconferencing systems facilitate both audio and video communication among participants over a network. A conventional video conferencing system includes near end and far end components. In a conventional videoconferencing system, video and/or audio data associated with a near end user is captured by a near end video camera or other capture device. The near end captured data is transmitted to a far end receiver and presented to a far end user. Far end captured data is received from a far end transmitter and presented to the near end user. The data can be transferred over one or more communications links available to the electronic device.

SUMMARY

The systems, methods and devices of the disclosure each have several innovative aspects, no single one of which is solely responsible for the desirable attributes disclosed herein.

One innovative aspect of the subject matter described in this disclosure can be implemented in a method of videoconferencing in a wireless network. The method includes determining at least one route quality indicator for each of a plurality of communication routes between a wireless device and a remote system. Each communication route is associated with at least one of a plurality of antennas. The method further includes selecting an antenna based on the one or more route quality indicators. The method further includes transmitting, from the wireless device to the remote system, video and/or audio data via the selected antenna.

In an embodiment, the at least one route quality indicator can include at least one of: a network statistic, a radio performance metric, a user performance metric, and a predictive performance metric. The network statistic can include at least one of: a one-way network latency, a round-trip time, a packet loss pattern, an available bandwidth, an end-to-end network latency, an end-to-end packet loss, and a jitter. The radio performance metric can include at least one of: a Signal-to-Noise Ratio (SNR), a transmit power level, and a Received Signal Strength Indication (RSSI). The user performance metric can include at least one of: a thermal metric, a power consumption rate, a CPU load, a buffer occupancy, a media playback state, a media playback configuration, and a user communication route preference.

In another embodiment, selecting the antenna can include selecting an antenna associated with the non-selected communication route, when the one or more route quality indicators for the selected communication route are below a threshold. The threshold can be based on the one or more route quality indicators for the selected communication route.

In another embodiment, the method can further include determining at least one route quality indicator for a non-selected communication route of the plurality of communication routes. The method can further include transmitting a test communication via the non-selected communication route. The method can further include determining the at least one route quality indicator for the non-selected communication route based on the test communication. Selecting the antenna can include selecting an antenna associated with the non-selected communication route when the one or more route quality indicators for the non-selected communication route are above a threshold. The threshold can be based on the one or more route quality indicators for the selected communication route.

Another innovative aspect of the subject matter described in this disclosure can be implemented in a method of videoconferencing in a wireless network. The method includes transmitting, from the wireless device to the remote system, video and/or audio data via a first antenna. The method further includes selecting a second antenna based on one or more route quality indicators. The method further includes determining a transition time based on an entropy of the video and/or audio data. The method further includes transitioning to the second antenna after the transition time.

In an embodiment, the method can further include determining an entropy value for a portion of the video and/or audio data. The method can further include transitioning to the selected communication route when the entropy is below a threshold. The method can further include refraining from transitioning to another antenna for a first time period after transitioning transmission to the second antenna. The method can further include sending a refresh signal to a media encoder.

Another innovative aspect of the subject matter described in this disclosure can be implemented in a method of videoconferencing in a wireless network. The method includes transmitting, from the wireless device to the remote system, video and/or audio data via a first antenna. The method further includes selecting a second antenna based on one or more route quality indicators. The method further includes filling a transmission queue associated with the second antenna prior to transitioning transmission to the second antenna. The method further includes transitioning transmission to the second antenna.

Another innovative aspect of the subject matter described in this disclosure can be implemented in a method of videoconferencing in a wireless network. The method includes transmitting, from the wireless device to the remote system, video and/or audio data via a first antenna. The method further includes selecting a second antenna based on one or more route quality indicators. The method further includes reducing a transfer rate of the video and/or audio data prior to transitioning to the second antenna. The method further includes transitioning transmission to the second antenna.

In an embodiment, the method can further include restoring an original transfer rate after to transitioning transmission to the second antenna. The method can further include adjusting the transfer rate of video and/or audio data, after transitioning to the second antenna, based on the one or more route quality indicators.

Another innovative aspect of the subject matter described in this disclosure can be implemented in a wireless device configured to perform videoconferencing in a wireless network. The wireless device includes one or more processors configured to determine at least one route quality indicator of a videoconference session for each of a plurality of communication routes between a wireless device and a remote system. Each communication route is associated with at least one of a plurality of antennas. The one or more processors are further configured to select an antenna based on the one or more route quality indicators. The wireless device further includes a transmitter configured to transmit, from the wireless device to the remote system, videoconference audio or video data via the selected antenna.

Another innovative aspect of the subject matter described in this disclosure can be implemented in an apparatus for videoconferencing in a wireless network. The apparatus includes means for determining at least one route quality indicator of a videoconference session for each of a plurality of communication routes between a wireless device and a remote system. Each communication route is associated with at least one of a plurality of antennas. The apparatus further includes means for selecting an antenna based on the one or more route quality indicators. The apparatus further includes means for transmitting, from the wireless device to the remote system, videoconference audio or video data via the selected antenna.

Another innovative aspect of the subject matter described in this disclosure can be implemented in a non-transitory computer-readable medium. The medium includes code that, when executed by one or more processors, causes an apparatus to determine at least one route quality indicator of a videoconference session for each of a plurality of communication routes between a wireless device and a remote system. Each communication route is associated with at least one of a plurality of antennas. The medium further includes code that, when executed by one or more processors, causes the apparatus to select an antenna based on the one or more route quality indicators. The medium further includes code that, when executed by one or more processors, causes the apparatus to transmit, from the wireless device to the remote system, videoconference audio or video data via the selected antenna.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
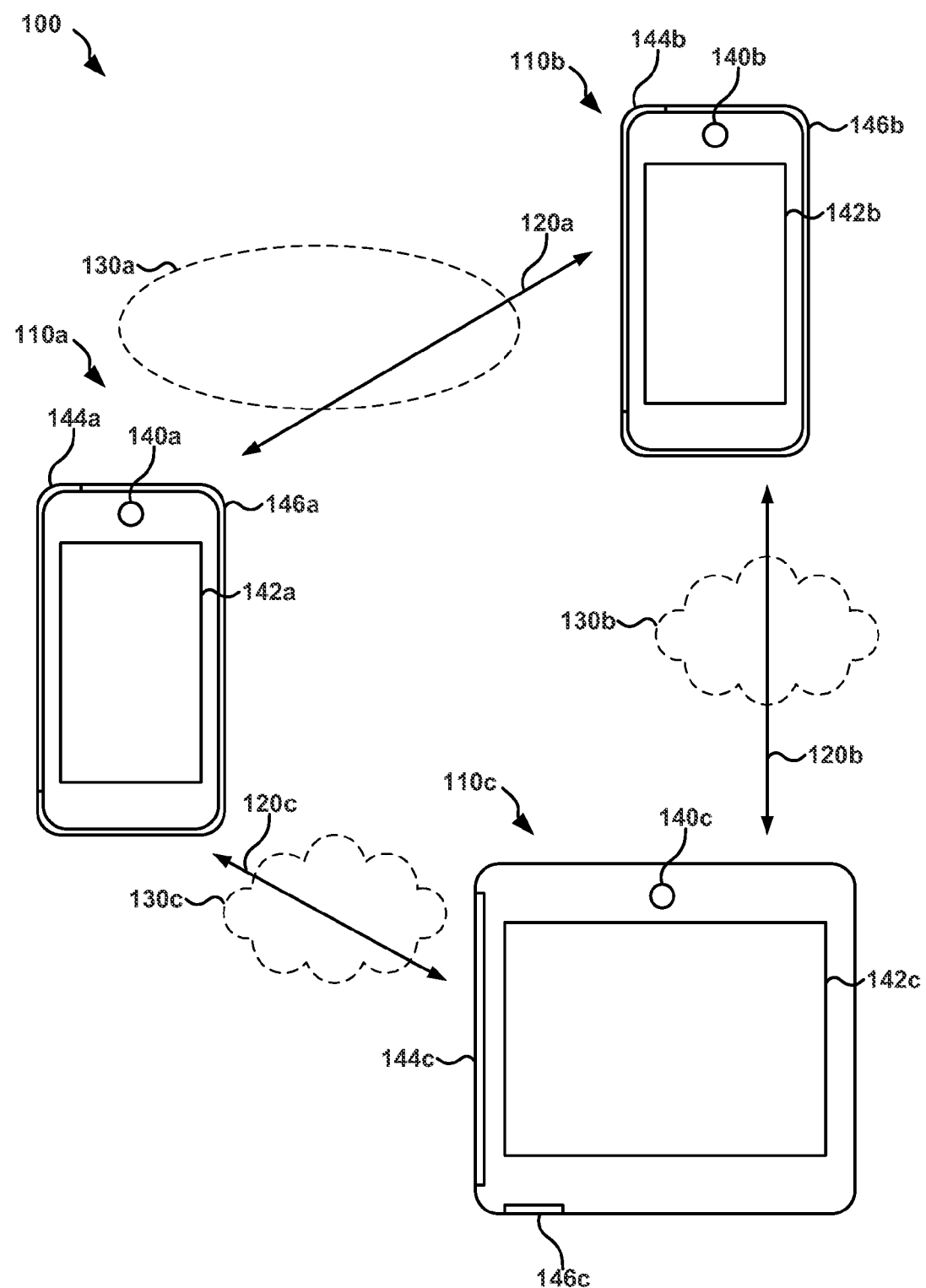
FIG. 1 shows an exemplary videoconferencing communication system.

One embodiment is a system and method for providing an enhanced videoconferencing capability for a wireless device. In one embodiment, a wireless device that is programmed with videoconferencing functions includes one or more modules configured to determine the quality of a variety of network routes that can accept the videoconferencing data. The device is programmed to compare the quality of each network route and select the highest quality route for the videoconferencing data. In this embodiment, the device may determine that a higher quality network route is available for the videoconference data, and then seamlessly and smoothly transfer the videoconference data to the higher quality network.

In one example, a first user may be performing a videoconference from a wireless device to second user. As the video conference call is progressing the wireless device may be programmed to determine the quality of the present videoconference. The device may also monitor data traffic and capacity on one or more alternative wireless data networks accessible by the device. If a determination is made that the videoconference could have improved quality by switching from a first network to a second network, the device will execute that switch to improve the videoconference call quality. In one example, the device may switch from a first cellular network system to a WiFi system. Because many new wireless devices, such as wireless telephone handsets and tablets have a plurality of antennas, they are able to communicate through a variety of different wireless protocols and standards.

In one embodiment, the device may detect that a threshold number of data packets have been lost. In another example, the device may detect that a new, higher bandwidth, network is available. The device may also be programmed by the user to automatically switch to a different network upon certain conditions being met. For example, the user may program the device to always switch from a cellular network to an available WiFi network to save cellular network costs and increase videoconference quality since a WiFi network normally has a higher bandwidth.

In yet another example, the device may store and retrieve past experience data to determine that a different network should be chosen. For example, the device may use an integrated GPS to store location data relating to geographic locations where data packet loss is very high. When the device later detects, through a GPS, that it is approaching an area of repeated data loss, it can switch to a different available network so that the videoconference call would not be dropped, or have its quality degraded.

In another embodiment, the device may detect its position in a user's hand to determine the proper antenna to use to communicate over the videoconference. For example, the device may include an accelerometer and a tilt detector, and thus be able to determine its orientation relative to the user. In addition, a proximity detector may be used to determine if the device is pressed against the user's face as in a normal telephone call. Using these data, the device may determine that one antenna or another is either more secure, or more reliable based on the orientation of the device with respect to the user.

In one embodiment, switching from one network to a second network is done in a way to minimize interference with the videoconference. For example, the device may be programmed to wait for a certain event to occur before switching. For example, device may be programmed to only switch networks during a momentary pause in the videoconference.

The following detailed description is directed to certain implementations for the purposes of describing the innovative aspects. However, the teachings herein can be applied in a multitude of different ways. The described implementations may be implemented in any device that is configured to perform wireless conferencing, including video and/or audio. More particularly, it is contemplated that the implementations may be implemented in or associated with a variety of electronic devices such as, but not limited to, mobile telephones, multimedia Internet enabled cellular telephones, wireless devices, smartphones, Bluetooth® devices, personal data assistants (PDAs), hand-held or portable computers, netbooks, notebooks, smartbooks, tablets, and a variety of electronic devices. The teachings herein also can be used in non-conferencing applications such as, but not limited to, one-way transmissions such as videocasting, audiocasting, and podcasting. Thus, the teachings are not intended to be limited to the implementations depicted solely in the Figures, but instead have wide applicability as will be readily apparent to a person having ordinary skill in the art.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards, and others, are known in the art.

FIG. 1 shows an exemplary videoconferencing communication system 100. In the illustrated embodiment, the videoconferencing communication system 100 includes wireless devices 110a-c. Although not shown, the videoconferencing communication system 100 can include additional wireless and/or wired devices (handheld or otherwise), in various embodiments. The wireless devices 110a-c can be configured to communicate with each other via one or more communication links 120a-c. For example, the wireless devices 110a-c can exchange audio and/or video data.

The various communication links 120a-c can include any combination of wired and wireless technologies. For example, the communication link 120a can communicate data, at least in part, over a cellular data network 130a. The cellular data network 130a can include communication link 120b can communicate data, at least in part, over a private network 130b. The communication link 120c can communicate data, at least in part, over the Internet 130b. Moreover, each communication link 120 can traverse a heterogeneous combination of networks types.

The wireless devices 110a-c include cameras 140a-c, displays 142a-c, and antennas 144a-c and 146a-c. In various embodiments, the wireless devices 110a-c can include one or more additional audio and/or video sensors, such as microphones, photo-detectors, etc. The wireless devices 110a-c can further include one or more additional audio and/or video output devices, such as speakers, indicator lights, etc. In various embodiments, the wireless devices 110a-c can include greater or fewer antennas.

The antennas 144a-c and 146a-c serve to facilitate wireless communication between the wireless devices 110a-c. In various embodiments, different antennas can be used in conjunction with different radio interfaces (see FIG. 2). For example, the antennas 144a-c can be used in conjunction with a WiFi radio, and the antennas 146a-c can be used in conjunction with a UMTS radio. In other embodiments, the antennas 144a-c and 146a-c can provide space diversity for a single radio interface. As will be discussed herein with respect to FIG. 2, the antennas 144a-c and 146a-c can be paired with any combination of radio interfaces.

Figure 2:
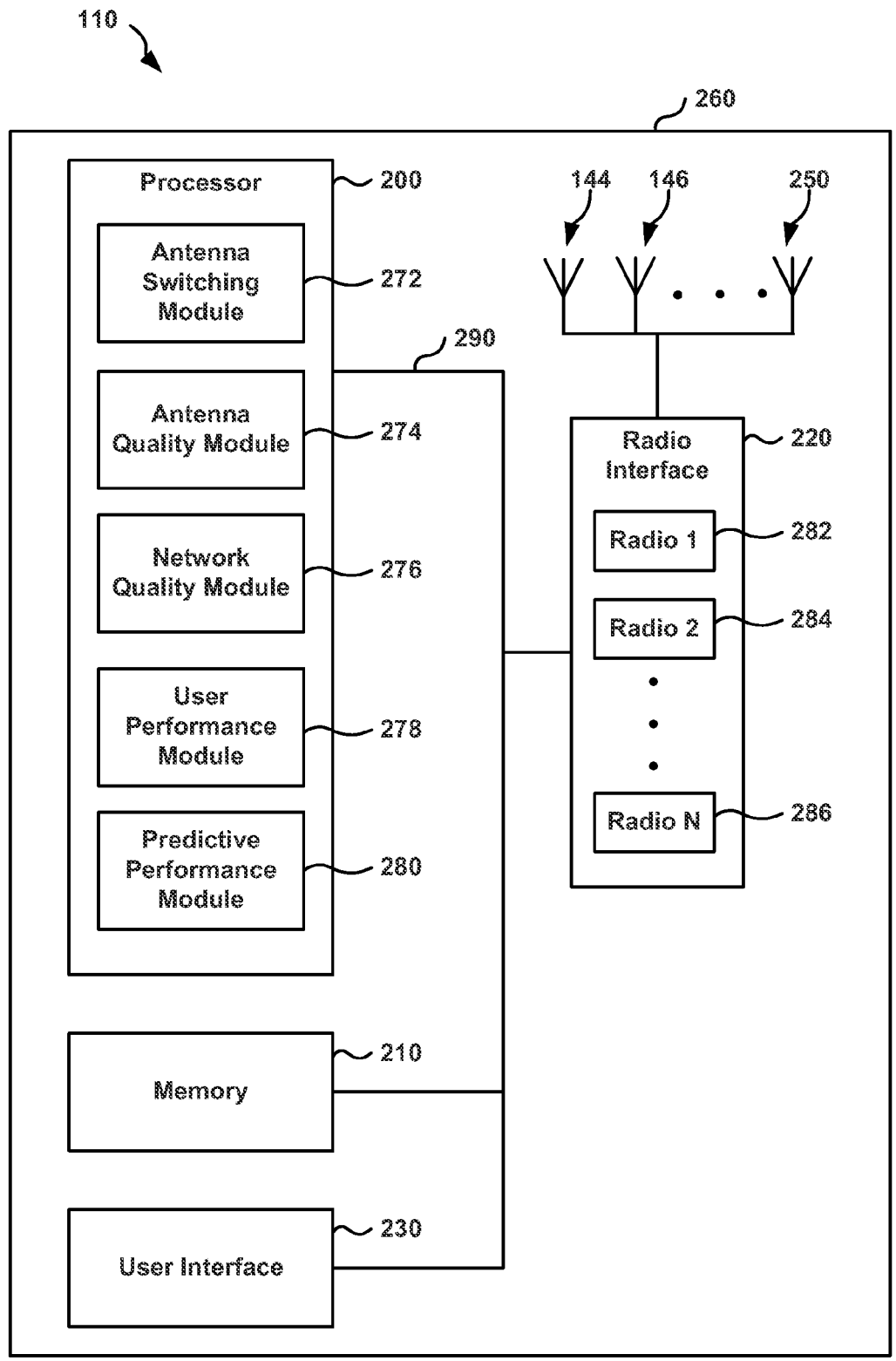
FIG. 2 shows an exemplary wireless device configured to perform videoconferencing.

FIG. 2 shows an exemplary wireless device 110 configured to perform videoconferencing. In the illustrated embodiment, the wireless device 110 includes a processor 200, a memory 210, a radio interface 220, a user interface 230, antennas 144, 146, and 250, and a housing 260. The wireless device 110 may be employed within the videoconferencing communication system 100, described above with respect to FIG. 1. The wireless device 110 is an example of a device that may be configured to implement the various methods described herein. For example, the wireless device 110 may implement one or more functions of the wireless device 110a-c.

The processor can serve to control operation of the wireless device 110. The processor 200 may also be referred to as a central processing unit (CPU). The memory 210 serves to provide instructions and data to the processor 200. The memory 210 can include read-only memory (ROM) and/or random access memory (RAM). A portion of the memory 210 can also include non-volatile random access memory (NVRAM). The processor 200 can perform logical and arithmetic operations based on program instructions stored within the memory 210. The instructions in the memory 210 can be executable to implement the methods described herein.

In an embodiment, the processor can be configured to execute a videoconferencing application in conjunction with one or more components of the wireless device 120. For example, the processor 210 can read the videoconferencing application from the memory 210, record video and/or audio via the user interface 230, transmit the video and/or audio to a remote device via the radio interface 220 and the one or more antennas 144, 146, and 250. The processor 210 can also receive video and/or audio from the remote device via the radio interface 220 and the one or more antennas 144, 146, and 250, and present the video and/or audio to a user via the user interface 230.

When the wireless device 110 communicates with the remote device, for example during a videoconference call, the audio and/or video data can traverse one or more network routes. Each network route can include a data path from the wireless device 110 to another device (for example, from the wireless device 110a to the wireless device 110b discussed above with respect to FIG. 1).

For example, the processor 200 may generate a communication link (such as videoconference data), and may select a radio and an antenna over which to transmit the communication. The communication may traverse one or more network access points, switches, routers, etc., before reaching a destination device. Accordingly, each network route can be associated with a particular radio, and a particular antenna.

Although the wireless device 110 has access to a plurality of network routes, not all routes are necessarily of the same quality. Certain network routes may be slow, for example, network routes that include a low bandwidth radio or a poorly tuned antenna. In an embodiment, an antenna may become detuned due to a relative position of a device user. Other routes may include quality radio paths (such as a fast link between the wireless device 110 and a base station) but may experience congestion due to a bottleneck on a base station's backhaul link. In various embodiments described herein, the wireless device 110 can include one or more modules configured to determine the a quality of a plurality of network routes, select a high quality route, effect a smooth transition to the selected network route, and/or manage communications over the selected network route after the transition.

Referring still to FIG. 2, the processor 200 can include one or more modules, including an antenna switching module 272, an antenna quality module 274, a network quality module 276, a user performance module 278, and a predictive performance module 280. As will be discussed herein with respect to FIG. 3, the antenna switching module 272 can serve to determine which antenna to use when transmitting and/or receiving videoconferencing data such as video and/or audio data.

As will be discussed herein with respect to FIG. 4, the antenna quality module can serve to determine an antenna quality metric, which the antenna switching module 272 can use to determine an antenna to use. Also, as will be discussed herein with respect to FIG. 5, the network quality module 276 can serve to determine a network quality metric, which the antenna switching module 272 can use to determine an antenna to use. In addition, as will be discussed herein with respect to FIG. 6, the user performance module 278 can serve to determine a user performance metric, which the antenna switching module 272 can use to determine an antenna to use. Further, as will be discussed herein with respect to FIG. 7, the predictive performance module 280 can serve to determine a network quality metric, which the antenna switching module 272 can use to determine an antenna to use.

Referring again to FIG. 2, in various embodiments, the modules 272, 274, 276, 278, and 280 can include one or more hardware components, and/or one or more software components. The modules 272, 274, and 276 can be implemented in conjunction with one or more other components of the processor 200, including the memory 210, the user interface 230, the radio interface 220, the antennas 144, 146, and 250, etc.

In various embodiments, the processor 200 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The radio interface 220 can serve to provide an interface between various components of the wireless device 110 (such as, for example, the processor 200), and one or more radios 282, 284, and 286. The radio interface can include one or more WiFi radios, one or more Bluetooth® radios, one or more cellular radios (for example, a UMTS radio), etc. In various embodiments, the radios 282, 284, and 286 can transmit and receive data via the antennas 144, 146, 250, in various combinations. For example, some of the radios 282, 284, and 286 can have a one-to-one relationship with the antennas 144, 146, 250. Other radios 282, 284, and 286 can have a one-to-many relationship with the antennas 144, 146, 250. The various radios 282, 284, and 286 can also share the antennas 144, 146, 250. In various embodiments, one or more of the antennas 144, 146, 250 can be integrated into the housing 260. In some embodiments, one or more antenna of the antennas 144, 146, 250 may be omitted, and the wireless device 110 may be configured for wired communication.

The user interface 230 can include, for example, the camera 140 (FIG. 1), the display 142, a proximity detector, one or more input buttons, a microphone, a speaker, and/or an interface port (for example, a Universal Serial Bus (USB) port, a High-Definition Multimedia Interface (HDMI) port, etc.). The display 142 can include a touchscreen. The user interface 230 can include any element or component that conveys information to a user of the wireless device 110 and/or receives input from the user.

In the illustrated embodiment, various components of the wireless device 110 are coupled together by a bus system 290. The bus system 290 can include a data bus, for example, as well as a power bus, a control signal bus, and a status signal bus in addition to the data bus. Those of skill in the art will appreciate the components of the wireless device 110 may be coupled together or accept or provide inputs to each other using some other mechanism.

Although a number of separate components are illustrated in FIG. 2, those of skill in the art will recognize that one or more of the components may be combined or commonly implemented. Further, each of the components illustrated in FIG. 2 may be implemented using a plurality of separate elements.

Figure 3:
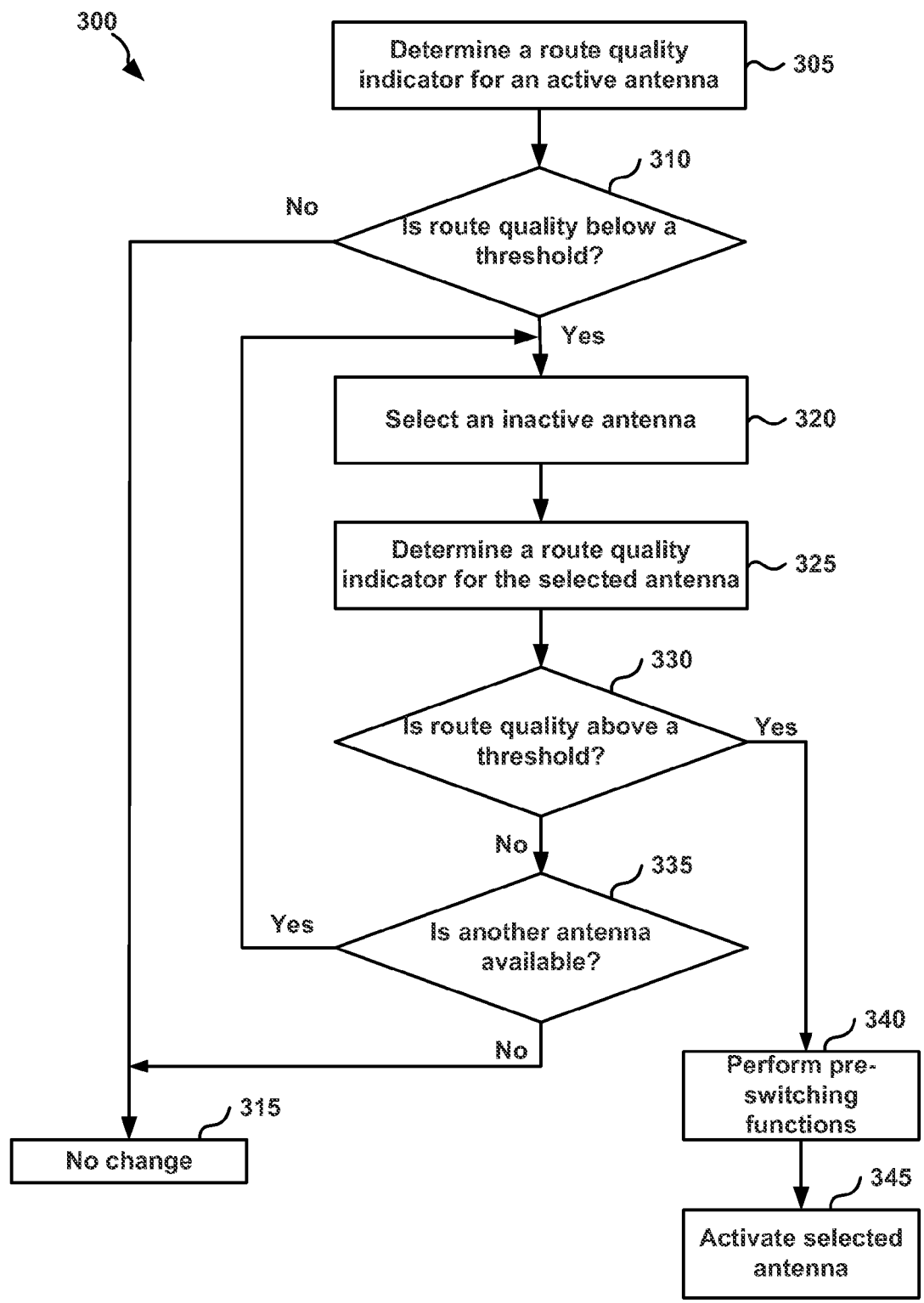
FIG. 3 is a flowchart depicting an exemplary method of selecting an antenna in the videoconferencing communication system of FIG. 1.

FIG. 3 is a flowchart 300 depicting an exemplary method of selecting an antenna in the videoconferencing communication system 100 of FIG. 1. Although the method of flowchart 300 is described herein with reference to the wireless device 102 discussed above with respect to FIG. 1, a person having ordinary skill in the art will appreciate that the method of flowchart 300 may be implemented by another suitable device. In an embodiment, the blocks in the flowchart 300 may be performed by the antenna switching module 272 (FIG. 2), in conjunction with one or more of the antenna quality module 274, the network quality module 276, the user performance module 278, the predictive performance module 280, the processor 200, the memory 210, and the antennas 144, 146, and 250. Although the method of flowchart 300 is described herein with reference to a particular order, in various embodiments, blocks herein may be performed in a different order, or omitted, and additional blocks may be added.

First, at block 305, the antenna switching module 272 determines a route quality indicator for an active antenna. The active antenna can be, for example, an antenna over which video and/or audio data is currently transmitted, or an antenna over which video and/or audio data is scheduled for transmission. In an embodiment, the active antenna is "active" with respect to a particular videoconferencing session. In another embodiment, the active antenna is "active" with respect to all transmissions from the wireless device 110. The route quality indicator can include one or more of a network quality metric, an antenna quality metric, a user performance metric, and a predictive performance metric.

In various embodiments, the antenna switching module 272 can determine the route quality indicator in conjunction with one or more of the antenna quality module 274, the network quality module 276, the user performance module 278, and the predictive performance module 280. For example, the antenna switching module 272 can determine the network quality metric in conjunction with the network quality module 276. The antenna switching module 272 can also determine the antenna quality metric in conjunction with the antenna quality module 274. The antenna switching module 272 can also determine the user performance metric in conjunction with the user performance module 278. The antenna switching module 272 can also determine the predictive performance metric in conjunction with the predictive performance module 280.

Next, at block 310, the antenna switching module 272 compares the route quality indicator to a switching threshold value. The switching threshold can indicate a minimum route quality below which the antenna switching module 272 should attempt to switch antennas. In various embodiments, the switching threshold can be retrieved from the memory 210, or dynamically computed by the processor 200.

In an embodiment, the antenna switching module 272 can compare one or more components of the route quality indicator to one or more respective thresholds. For example, the antenna switching module 272 can compare a network quality metric, received from the network quality module 276, to a network quality switching threshold. Similarly, the antenna switching module 272 can compare an antenna quality metric, received from the antenna quality module 274, to an antenna quality switching threshold. The antenna switching module 272 can also compare a user performance metric, received from the user performance module 276, to a user performance switching threshold. The antenna switching module 272 can also compare a predictive performance metric, received from the predictive performance module 280, to a predictive performance switching threshold. In embodiments where the route quality indicator is a function of the one or more component metrics described herein, the antenna switching module 272 can compare the route quality indicator to a combined activation threshold.

Referring still to FIG. 3, if the route quality indicator is at or above the switching threshold, the antenna switching module 272 can determine that the active antenna is performing acceptably at block 315. Accordingly, the antenna switching module 272 may not switch antennas. On the other hand, if the route quality indicator is below the switching threshold, the antenna switching module 272 can begin searching for an acceptable alternative antenna at block 320.

In one embodiment, the antenna switching module 272 can search for an alternative antenna, even when the route quality indicator is at or above the switching threshold. For example, the antenna switching module 272 can proceed to block 320 to determine whether another antenna has a higher route quality indicator. In an embodiment, the antenna switching module 272 can determine which alternative antenna has the highest route quality indicator.

Then, at block 320, the antenna switching module 272 selects an inactive antenna, which may be a candidate for activation. The antenna switching module 272 can select a candidate inactive antenna be iterating through inactive antennas, randomly choosing an antenna, or any other method. In an embodiment, an "inactive" antenna is inactive with respect to a particular data session, such as a particular video conference. For example, an antenna that is inactive with respect to a particular video conferencing session may still be in use with respect to other data applications. In another embodiment, an "inactive" antenna can be inactive with respect to all data transmissions of the wireless device 110.

Thereafter, at block 325, the antenna switching module 272 determines a route quality indicator for the selected inactive antenna. As discussed above, the route quality indicator can include one or more of a network quality metric, an antenna quality metric, a user performance metric, and a predictive performance metric. The antenna switching module 272 can determine the route quality indicator in conjunction with one or more of the antenna quality module 274, the network quality module 276, the user performance module 278, and the predictive performance module 280.

Subsequently, at block 330, the antenna switching module 272 compares the route quality indicator to an activation threshold value. The activation threshold can indicate a route quality above which the antenna switching module 272 should switch antennas by activating the selected candidate inactive antenna. In various embodiments, the activation threshold can be retrieved from the memory 210, or dynamically computed by the processor 200.

In an embodiment, the antenna switching module 272 can compare one or more components of the route quality indicator to one or more respective thresholds. For example, the antenna switching module 272 can compare a network quality metric, received from the network quality module 276, to a network quality activation threshold. Similarly, the antenna switching module 272 can compare an antenna quality metric, received from the antenna quality module 274, to an antenna quality activation threshold. In embodiments where the route quality indicator is a function of the one or more component metrics described herein, the antenna switching module 272 can compare the route quality indicator to a combined switching threshold.

Referring still to FIG. 3, if the route quality indicator is at or below the activation threshold, the antenna switching module 272 can determine that the selected candidate antenna is not acceptable, and can attempt to select another candidate antenna. At block 335, the antenna switching module 272 determines whether another candidate antenna is available. If so, the antenna switching module 272 selects another candidate antenna at block 300. Otherwise, the antenna switching module 272 can determine that there is not a more acceptable antenna available at block 315.

Referring again to block 330, if the route quality indicator is above the activation threshold, the antenna switching module 272 can determine that the candidate antenna should be activated. In one embodiment, the antenna switching module 272 may check all available channels to find the best quality channel. For example, the antenna switching module 272 may select another candidate antenna at block 300, even when the route quality indicator for the currently selected candidate antenna is above the activation threshold. After checking all available channels, the antenna switching module 272 may select the antenna with the highest route quality indicator for activation at block 315.

In an embodiment, the antenna switching module 272 may not switch antennas immediately. Instead, the antenna switching module 272 can perform one or more pre-activation functions at block 340. As will be described herein with respect to FIG. 8, the pre-activation functions can serve to minimize perceived disruption to a media stream. For example, the antenna switching module 272 can determine an acceptable time at which to switch antennas, pre-fill the baseband queue of the candidate antenna before switching to the candidate antenna, and/or throttle the media stream prior to activating the new antenna.

Then, at block 345, the antenna switching module 272 activates the selected candidate antenna. In an embodiment, the antenna switching module 272 can activate the selected candidate antenna by sending and/or receiving subsequent data over that antenna. In various embodiments, the antenna switching module 272 can deactivate the original active antenna, or otherwise cease transmission of data over the original antenna.

As described above with respect to embodiment of FIG. 3, the antenna switching module 272 is configured switch antennas when the active antenna falls below a first threshold quality level, and an inactive antenna exceeds a second threshold quality level. By way of non-limiting example, the antenna switching module 272 may determine a signal-to-noise ratio (SNR) of the active antenna in conjunction with the antenna quality module 274. If the SNR of the active antenna falls below a switching SNR threshold, the antenna switching module 272 may attempt to find another antenna with a better SNR. If the antenna switching module 272 finds a candidate inactive antenna with an SNR above an activation SNR threshold, the antenna switching module 272 may switch communications to the candidate antenna. The various switching thresholds and activation thresholds can be the same value, although they may also be different.

In another embodiment, the antenna switching module 272 may omit the search for a "better" antenna. In other words, the antenna switching module 272 can be configured to switch antennas when the route quality of communications over the active antenna drop below the switching threshold, regardless of a route quality with respect to any other antenna. For example, the antenna switching module 272 can switch to an inactive antenna (for example, on a round-robin, random, or pseudorandom basis). If the newly activated antenna is also unacceptable, the antenna switching module 272 may keep switching to other inactive antennas until an acceptable antenna is activated.

In yet another embodiment, the antenna switching module 272 may omit determination of the route quality indicator for the active antenna. For example, the antenna switching module 272 may continuously or intermittently search for a "better" antenna by polling the route quality indicator for inactive antennas (for example, on a round-robin, random, or pseudo-random basis). Thus, the antenna switching module 272 can be configured to switch antennas when the route quality with respect to an inactive antenna exceeds the activation threshold, regardless of a route quality with respect to the active antenna.

In another embodiment, the antenna switching module 272 may determine the route quality indicator for both the active antenna and one or more inactive antennas, and may compare the route quality indicators. The antenna switching module 272 may then select the antenna associated with the highest route quality indicator. In other words, the antenna switching module 272 may continue using the active antenna when it is associated with the highest route quality indicator, and may switch to another antenna when that antenna is associated with the highest route quality indicator.

Figure 4:
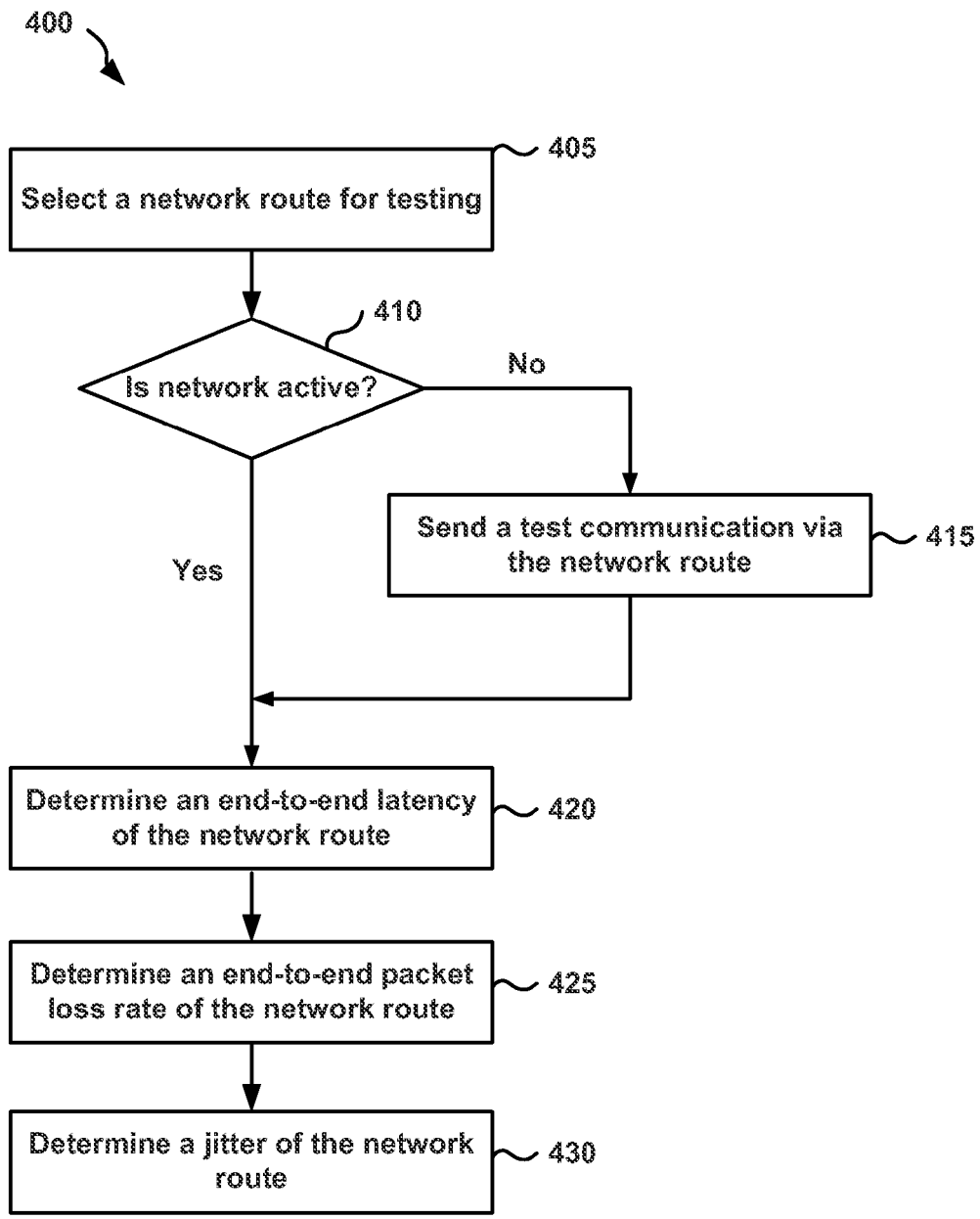
FIG. 4 is a flowchart depicting an exemplary method of determining a network quality metric.

FIG. 4 is a flowchart 400 depicting an exemplary method of determining a network quality metric. Although the method of flowchart 400 is described herein with reference to the wireless device 102 discussed above with respect to FIG. 1, a person having ordinary skill in the art will appreciate that the method of flowchart 400 may be implemented by another suitable device. In an embodiment, the blocks in the flowchart 400 may be performed by the network quality module 276 (FIG. 2) in conjunction with one or more of the antenna switching module 272, the processor 200, the memory 210, and the antennas 144, 146, and 250. Moreover, the blocks in the flowchart 400 may implement at least a portion of the functionality described above with respect to blocks 305 and/or 325 of FIG. 3. Although the method of flowchart 400 is described herein with reference to a particular order, in various embodiments, blocks herein may be performed in a different order, or omitted, and additional blocks may be added.

First, at block 405, the network quality module 276 selects (or receives) a network route for testing. As discussed above, the network route can include a data path from the wireless device 110 to another device (for example, from the wireless device 110a to the wireless device 110b discussed above with respect to FIG. 1). For example, the processor 200 may generate a communication (such as videoconference data), and may select a radio and an antenna over which to transmit the communication. The communication may traverse one or more network access points, switches, routers, etc., before reaching a destination device. Accordingly, each network route can be associated with a particular antenna.

Next, at block 410, the network quality module 276 determines whether the selected network route is active. In an embodiment, a network route is active when it is associated with an active antenna. In another embodiment, a network route is active when the wireless device 110 transmits and/or receives data over the route. If the network route is not active, the network quality module 276 may not be capable of determining any network quality metrics for the route. Accordingly, the network quality module 276 can be configured to send a test communication via the network route at block 415.

Referring still to block 415, in an embodiment, the test communication may include null data. In other words, the test communication may not include data associated with a pre-existing data session. In another embodiment, the test communication can include duplicate data. For example, the test communication can include a portion of data (such as audio and/or video data) also communicated via another network route. If the test communication results in a high quality metric, the antenna switching module 272 can begin transmitting the video portion over the selected antenna.

When the network route is active, or when a test communication is sent, the network quality module 276 determines one or more network route metrics. Network route metrics can include, for example, an a one-way network latency, a round-trip time, a packet loss pattern, an available bandwidth, an end-to-end latency, an end-to-end packet loss rate, a jitter of the network route, etc. In various embodiments, the network quality module 276 can determine additional network route metrics known in the art.

At block 420, the network quality module 276 determines an end-to-end latency of the network route. In an embodiment, the network quality module 276 measures the time between transmission of a packet, and the receipt of an acknowledgment or other reply. In various embodiments, the network quality module 276 can receive end-to-end latency data from a remote device. For example, a videoconferencing application on the wireless device 110a can receive end-to-end latency measurements from another videoconferencing application on the wireless device 110b.

Then, at block 425 the network quality module 276 determines an end-to-end packet loss rate of the network route. In an embodiment, the network quality module 276 can determine the end-to-end packet loss rate by measuring the number of packets sent, and the number of packets acknowledged. In various embodiments, the network quality module 276 can receive end-to-end packet loss rate from a remote device. For example, a videoconferencing application on the wireless device 110a can receive end-to-end packet loss measurements from another videoconferencing application on the wireless device 110b.

Subsequently, at block 430 the network quality module 276 determines a jitter of the network route. In an embodiment, the network quality module 276 can determine the jitter by measuring the variation in latency measurements. In various embodiments, the network quality module 276 can receive jitter from a remote device. For example, a videoconferencing application on the wireless device 110a can receive jitter measurements from another videoconferencing application on the wireless device 110b.

Figure 5:
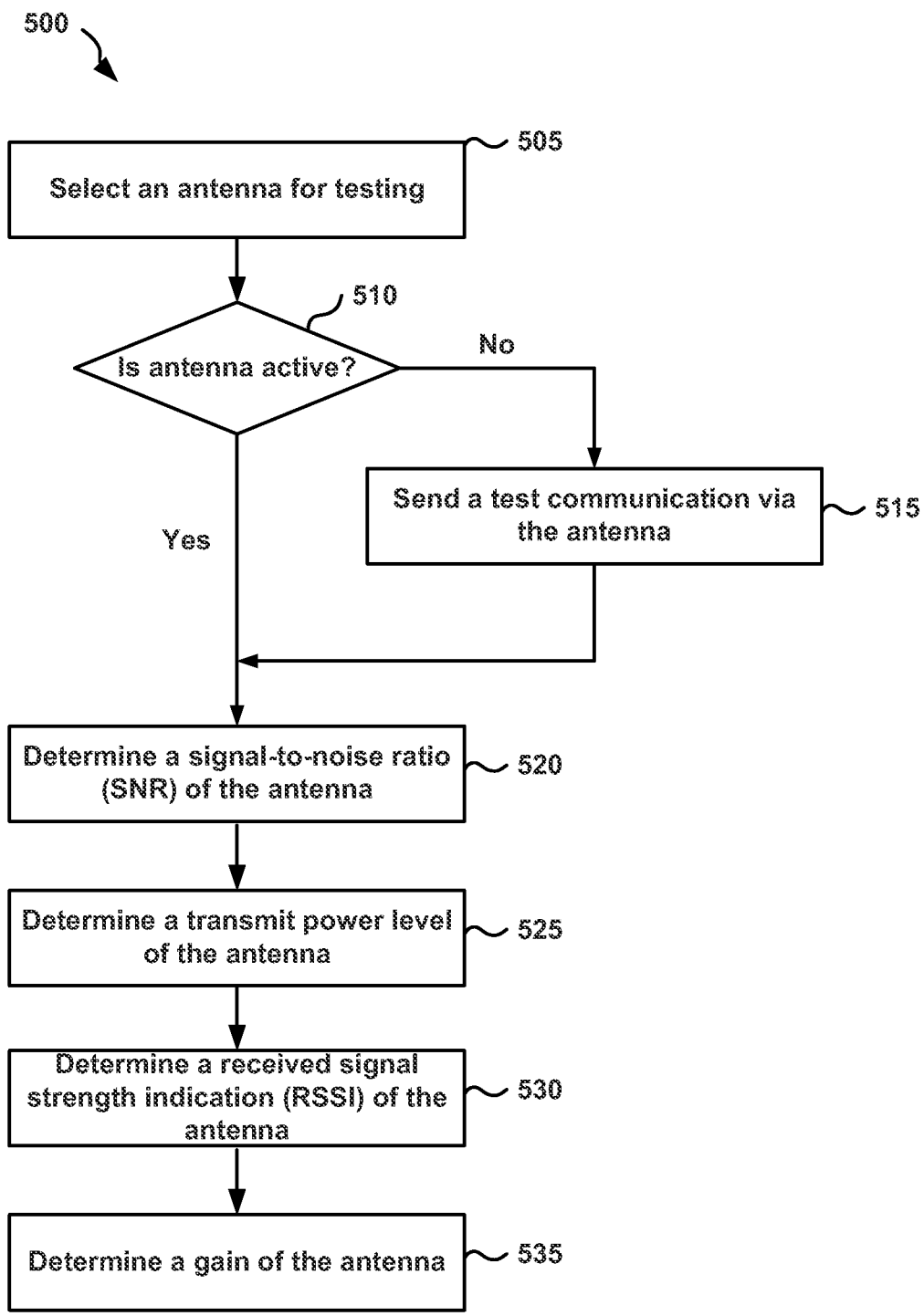
FIG. 5 is a flowchart depicting an exemplary method of determining an antenna quality metric.

FIG. 5 is a flowchart 500 depicting an exemplary method of determining an antenna quality metric. Although the method of flowchart 500 is described herein with reference to the wireless device 102 discussed above with respect to FIG. 1, a person having ordinary skill in the art will appreciate that the method of flowchart 500 may be implemented by another suitable device. In an embodiment, the blocks in the flowchart 500 may be performed by the antenna quality module 274 (FIG. 2) in conjunction with one or more of the antenna switching module 272, the processor 200, the memory 210, and the antennas 144, 146, and 250. Moreover, the blocks in the flowchart 500 may implement at least a portion of the functionality described above with respect to blocks 305 and/or 325 of FIG. 3. Although the method of flowchart 500 is described herein with reference to a particular order, in various embodiments, blocks herein may be performed in a different order, or omitted, and additional blocks may be added.

First, at block 505, the antenna quality module 274 selects (or receives) an antenna for testing. Next, at block 510, the antenna quality module 274 determines whether the selected antenna is active. If the antenna is not active, the antenna quality module 274 may not be capable of determining any quality metrics for the antenna. Accordingly, the antenna quality module 274 can be configured to send a test communication via the antenna at block 515.

Referring still to block 515, in an embodiment, the test communication may include null data. In other words, the test communication may not include data associated with a pre-existing data session. In another embodiment, the test communication can include duplicate data. For example, the test communication can include a portion of data (such as audio and/or video data) also communicated via another antenna. In another embodiment, the test communication can include original data. In other words, the test communication can include a portion of a data session not communicated via another antenna. For example, the test communication can include an audio portion of a videoconference session. If the test communication results in a high quality metric, the antenna switching module 272 can begin transmitting the video portion over the selected antenna.

When the antenna is active, or when a test communication is sent, the antenna quality module 274 determines one or more antenna metrics. Antenna metrics can include, for example, an SNR, a transmit power level, a received signal strength indication (RSSI), antenna gain, etc. In various embodiments, the antenna quality module 274 can determine additional antenna metrics known in the art.

At block 520, the antenna quality module 274 determines an SNR of the antenna. A high SNR can indicate that a communication rate is possible. In an embodiment, the antenna quality module 274 can determine the SNR by querying the radio interface 220 and/or a baseband function. In various embodiments, the antenna quality module 274 can receive SNR data from a remote device. For example, a videoconferencing application on the wireless device 110a can receive SNR measurements from another videoconferencing application on the wireless device 110b.

Then, at block 525 the antenna quality module 274 determines a transmit power level of the antenna. A high transmit power level can indicate that the wireless device 110 is far from an access point, or that there is a lot of interference in the transmit channel. In an embodiment, the antenna quality module 274 can determine the transmit power level by querying the radio interface 220 and/or a baseband function. In various embodiments, the antenna quality module 274 can receive transmit power level from a remote device. For example, a videoconferencing application on the wireless device 110a can receive end-to-end packet loss measurements from another videoconferencing application on the wireless device 110b.

Subsequently, at block 530 the antenna quality module 274 determines a Receive Signal Strength Indicator (RSSI) for the antenna. A high RSSI can indicate that the wireless device 110 is close to an access point. In an embodiment, the antenna quality module 274 can determine the RSSI by querying the radio interface 220 and/or a baseband function. In various embodiments, the antenna quality module 274 can receive a RSSI from a remote device. For example, a videoconferencing application on the wireless device 110a can receive RSSI measurements from another videoconferencing application on the wireless device 110b.

Thereafter, at block 535 the antenna quality module 274 determines a gain of the antenna. In an embodiment, the antenna quality module 274 can determine the gain by querying the radio interface 220 and/or a baseband function. In various embodiments, the antenna quality module 274 can receive gain from a remote device. For example, a videoconferencing application on the wireless device 110a can receive gain measurements from another videoconferencing application on the wireless device 110b.

Figure 6:
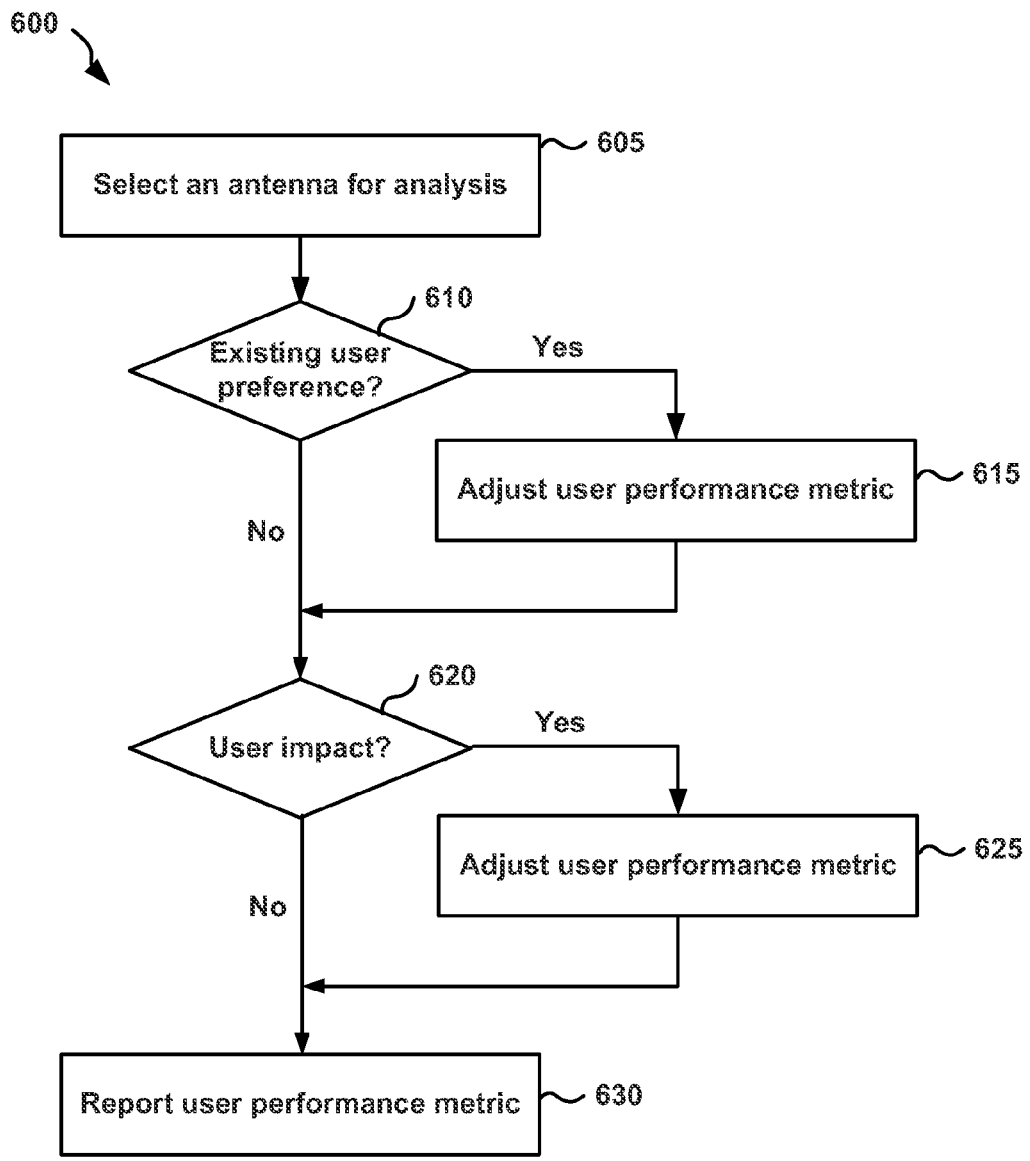
FIG. 6 is a flowchart depicting an exemplary method of determining a user performance metric.

FIG. 6 is a flowchart 600 depicting an exemplary method of determining a user performance metric. Although the method of flowchart 600 is described herein with reference to the wireless device 102 discussed above with respect to FIG. 1, a person having ordinary skill in the art will appreciate that the method of flowchart 600 may be implemented by another suitable device. In an embodiment, the blocks in the flowchart 600 may be performed by the user performance module 278 (FIG. 2) in conjunction with one or more of the antenna switching module 272, the processor 200, the memory 210, and the user interface 230. Moreover, the blocks in the flowchart 600 may implement at least a portion of the functionality described above with respect to blocks 305 and/or 325 of FIG. 3. Although the method of flowchart 600 is described herein with reference to a particular order, in various embodiments, blocks herein may be performed in a different order, or omitted, and additional blocks may be added.

First, at block 605, the user performance module 278 selects (or receives) an antenna for analysis. Next, at block 610, the user performance module 278 determines whether there is an existing user preference with respect to the selected antenna. In an embodiment, the wireless device 110 can receive one or more user preferences via the user interface 230, and the user preferences can be stored in the memory 210. User preferences can include, for instance, a preference for certain radios and/or associated antennas. A user may prefer that the wireless device 110 use a WiFi radio and/or antenna, as opposed to a UMTS radio and/or antenna, which may incur usage charges from a wireless carrier.

At block 615, if a user preference exists, the user performance module 278 can apply the preference to the user performance metric. For example, if a user prefers to use WiFi over UMTS, the user performance module 278 can increase the user performance metric reported with respect to the WiFi antenna, and decrease the user performance metric reported with respect to the UMTS antenna. In an embodiment, the user performance module 278 can adjust the user performance metric based on a weight or priority associated with each user preference.

Then, at block 620, the user performance module 278 determines whether there is condition associated with the selected antenna that can negatively impact user experience. In an embodiment, the user performance module 278 can measure a CPU load associated with communication via the selected antenna. For example, some radios and/or antennas may require greater processing power, which might affect device responsiveness. The user performance module 278 can also measure a power consumption associated with communication via the selected antenna. For example, some radios and/or antennas may require greater power consumption, which might reduce battery life. In one embodiment, the user performance module 278 can also measure a temperature of the device in order to select an antenna based, at least in part, on thermal design constraints.

The user performance module 278 can also measure a device position with respect to the user. For example, the user interface 230 can include a proximity sensor that can detect which the position of one or more antennas with respect to the user's head. The user performance module 278 can be configured to adjust the user performance metric such that preference is given to antennas away from the user's head. In various embodiments, the user performance module 278 can monitor one or more of a playback or transmission buffer occupancy, a media playback state (such as paused, playing, stopped, fast forward, etc.), an audio state (such as muted, dropped-out, etc.), etc. In an embodiment, the user performance module 278 can provide audio and/or visual feedback regarding one or more route quality metrics, to the user via the user interface 230.

At block 625, if a user impact exists, the user performance module 278 can adjust the user performance metric accordingly. For example, if a certain antenna will increase power consumption, the user performance module 278 can reduce the user performance metric associated with that antenna. In an embodiment, the user performance module 278 can adjust the user performance metric based on a weight or priority associated with each type of user impact. Subsequently, at block 630, the user performance module 278 can report the user performance metric.

Figure 7:
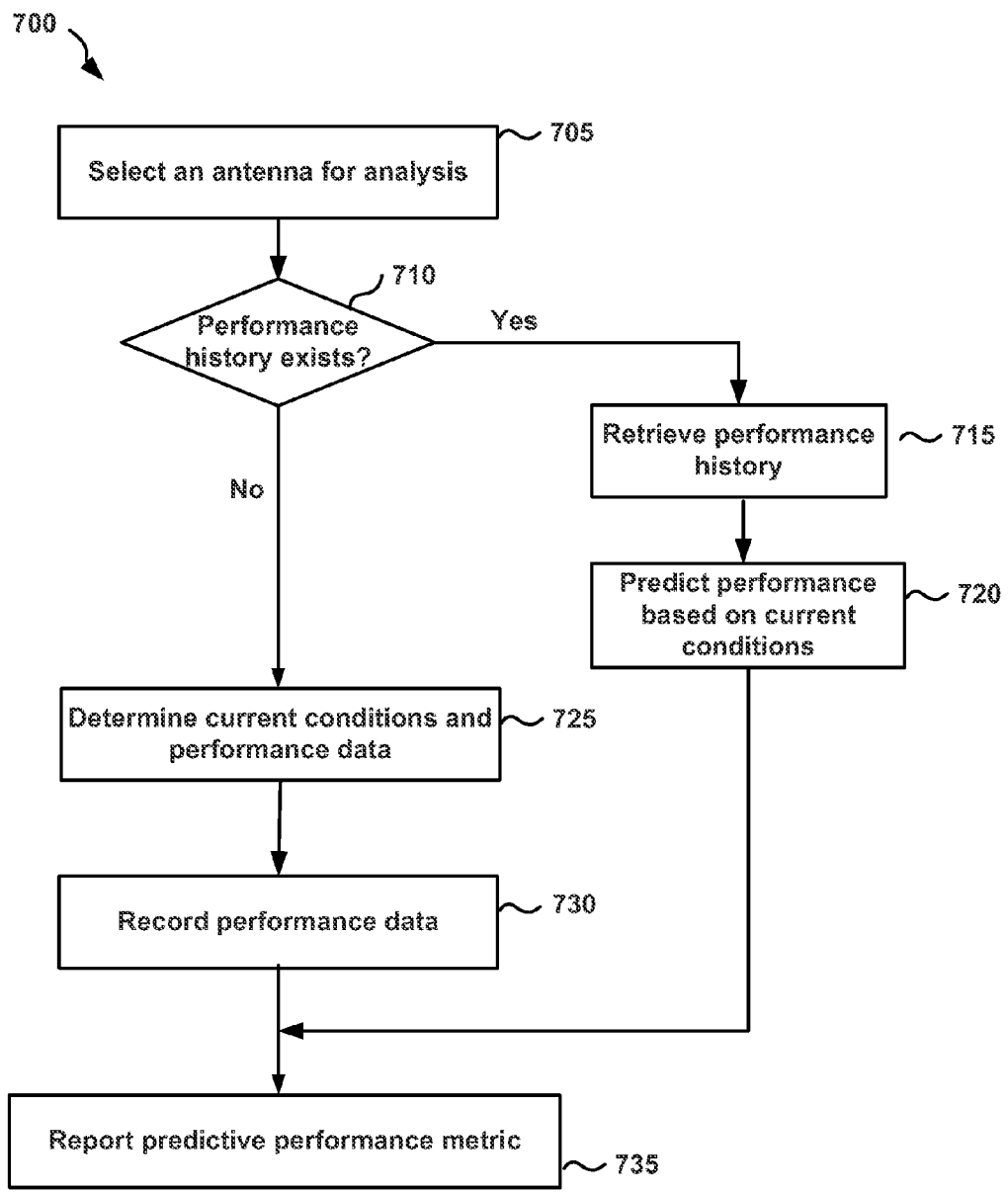
FIG. 7 is a flowchart depicting an exemplary method of determining a predictive performance metric.

FIG. 7 is a flowchart 700 depicting an exemplary method of determining a predictive performance metric. Although the method of flowchart 700 is described herein with reference to the wireless device 102 discussed above with respect to FIG. 1, a person having ordinary skill in the art will appreciate that the method of flowchart 700 may be implemented by another suitable device. In an embodiment, the blocks in the flowchart 700 may be performed by the predictive performance module 280 (FIG. 2) in conjunction with one or more of the antenna switching module 272, the processor 200, the memory 210, and the antennas 144, 146, and 250. Moreover, the blocks in the flowchart 700 may implement at least a portion of the functionality described above with respect to blocks 305 and/or 325 of FIG. 3. Although the method of flowchart 700 is described herein with reference to a particular order, in various embodiments, blocks herein may be performed in a different order, or omitted, and additional blocks may be added.

First, at block 705, the predictive performance module 280 selects (or receives) an antenna for analysis. Next, at block 710, the predictive performance module 280 determines whether there is an existing historical performance record with respect to the selected antenna. Historical performance records can include information correlating one or more situational factors with antenna performance. For example, historical performance records can include information including a timestamp, device location, speed, direction, altitude, battery state, user activity, nearby access points, latency, throughput, jitter, packet loss, SNR, transmit power, antenna gain, RSSI, etc.

In an embodiment, the predictive performance module 280 can query the memory 210 to determine whether a record exists with respect to the selected antenna. In an embodiment, historical performance records may include timestamps, and the predictive performance module 280 may only determine that a valid record exists if the record is within a threshold age.

At block 715, if a performance history record exists, the predictive performance module 280 retrieves the record from the memory 210. Then, at block 720, the predictive performance module 280 can then determine current conditions and predict performance of the selected antenna based on the current conditions and the performance history data. For example, if WiFi packet loss has historically been high when the wireless device 110 is traveling at 60 mph, and the wireless device 110 is currently travelling at 60 mph, the predictive performance module 280 may predict poor WiFi performance. Accordingly, the predictive performance module 280 may reduce the predictive performance metric for an antenna associated with the WiFi radio.

At block 725, if a performance history record does not exist, the predictive performance module 280 determines current conditions and performance data. In an embodiment, predictive performance module 280 can determine current performance data in conjunction with one or more of the antenna quality module 274, the network quality module 276, and the user performance module 278. Thereafter, at block 730, the predictive performance module 280 records the performance data in the memory 210.

Subsequently, at block 735, the predictive performance module 280 reports the predictive performance metric. If there was no existing performance history record, the predictive performance module 280 may report a neutral or null predictive performance metric. In an embodiment, the antenna switching module may not include a neutral or null predictive performance metric when determining the route quality indicator.

Figure 8:
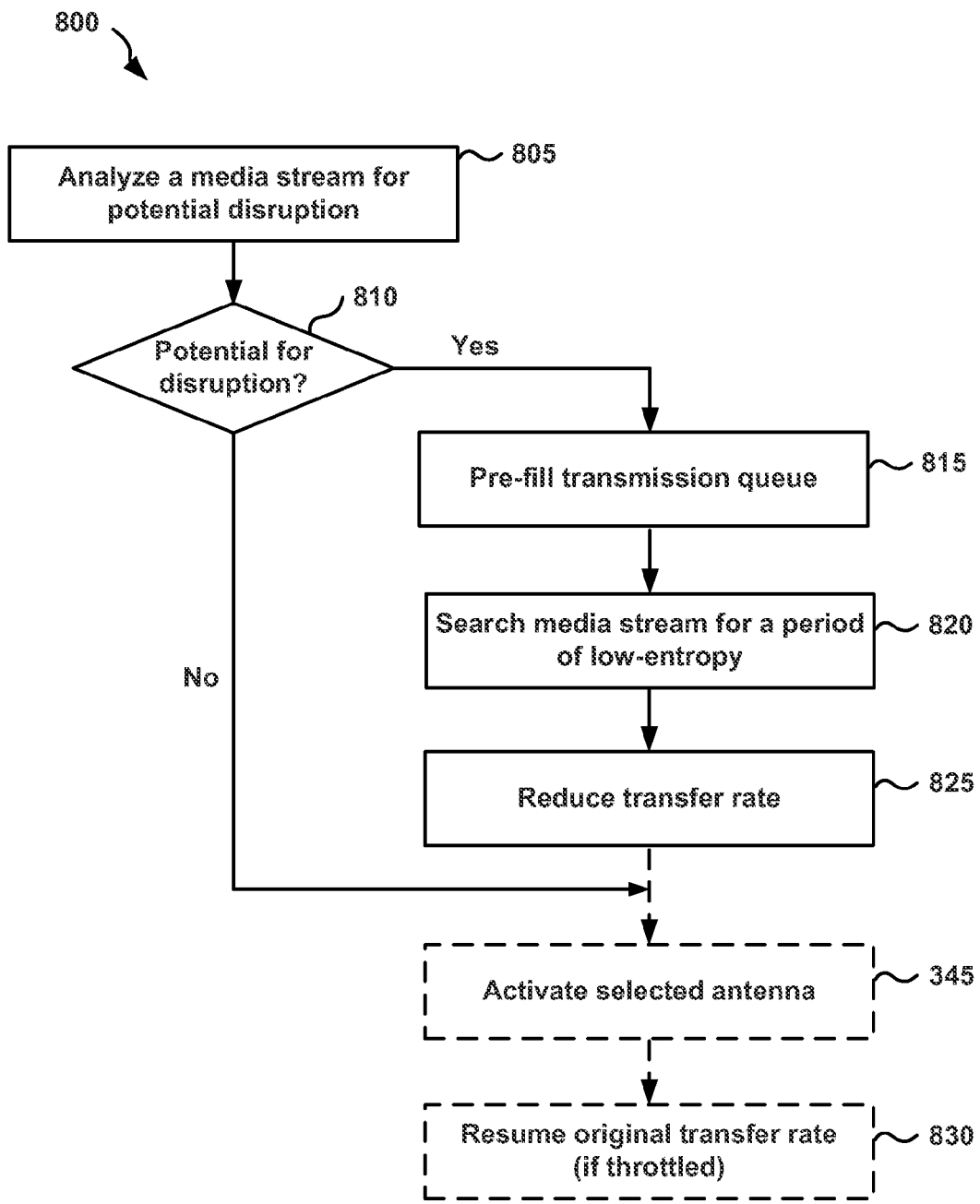
FIG. 8 is a flowchart depicting an exemplary method of performing pre-activation functions.

FIG. 8 is a flowchart 800 depicting an exemplary method of performing pre-activation functions. Although the method of flowchart 800 is described herein with reference to the wireless device 102 discussed above with respect to FIG. 1, a person having ordinary skill in the art will appreciate that the method of flowchart 800 may be implemented by another suitable device. In an embodiment, the blocks in the flowchart 800 may be performed by the antenna switching module 272 (FIG. 2) in conjunction with one or more of the radio interface 220, the processor 200, the memory 210, and the antennas 144, 146, and 250. Moreover, the blocks in the flowchart 800 may implement at least a portion of the functionality described above with respect to block 340 of FIG. 3. Although the method of flowchart 800 is described herein with reference to a particular order, in various embodiments, blocks herein may be performed in a different order, or omitted, and additional blocks may be added.

First, at block 805, the antenna switching module 272 analyzes a communication (such as a media stream) to ascertain the likelihood of a disruption during activation of, and switching to, a new antenna. The antenna switching module 272 may determine that there is a relatively high likelihood of disruption when, for example, the bit-rate of the media stream is high compared to the bandwidth available to a network route including the selected antenna. In an embodiment, the antenna switching module 272 can determine a disruption metric indicative of the likelihood of disruption.

Next, at block 810, the antenna switching module 272 can compare the disruption metric to a disruption threshold in order to determine whether the potential for disruption is acceptable. If the likelihood of disruption is acceptable, the antenna switching module 272 can terminate pre-activation functions and proceed to switch antennas at block 345 (FIG. 3). On the other hand, if the antenna switching module 272 determines that the potential for disruption is unacceptable, the antenna switching module 272 can perform one or more pre-activation functions at blocks 815, 820, and 825.

At block 815, the antenna switching module 272 can pre-fill a transmission queue for the selected antenna and associated radio, if an individual transmission queue is available. In an embodiment, pre-filling the individual transmission queue can reduce packet loss.

Then, at block 820, the antenna switching module 272 can search the media stream for a period of low-entropy in order to determine an acceptable time at which to switch antennas. In various embodiments, the antenna switching module 272 can determine an acceptable time to switch antennas based on one or more of a detected audio silence, a timeout period, a video position and/or frame type, a status of a baseband queue of the candidate antenna, etc. For example, the switching module 272 can look forward a playback buffer, searching for a period of silence, darkness, or low entropy in a media stream. The antenna switching module 272 can time the antenna switch to coincide with the period of silence, darkness, or low entropy, during which a user may be less likely to notice any interruption.

In an embodiment, if the antenna switching module 272 does not detect a period of low entropy below an acceptable entropy threshold within a timeout period, the antenna switching module 272 may abort activation of the selected antenna. In another embodiment, if the antenna switching module 272 does not detect a period of low entropy below an acceptable entropy threshold within a timeout period, the antenna switching module 272 can activate the selected antenna (at block 345) irrespective of the determined entropy. In yet another embodiment, the antenna switching module 272 may continue to increase the acceptable entropy threshold one or more times after one or more timeout periods, until the antenna switching module 272 detects a period of low entropy below an acceptable entropy threshold.

Subsequently, at block 825, the antenna switching module 272 can reduce a transfer rate (including a frame rate and/or audio bit-rate) during a period leading up to an antenna switch. In an embodiment, reducing the bandwidth requirements of the media stream prior to antenna activation may further reduce potential packet loss. In an embodiment, the antenna switching module 272 can effect a reduction in transfer rate by notifying one or more hardware and/or software components (such as, for example, audio and/or video codecs) of an impending antenna switch. Audio and/or video codecs may respond by reducing a target bit-rate, adjusting a number of key and/or reference frames in the media stream, etc.

Thereafter, at block 345, the antenna switching module 272 can activate the selected antenna. Post-activation, at block 830, the antenna switching module 272 can resume the original transfer rate, in embodiments where the antenna switching module 272 reduced the transfer rate prior to antenna activation. In various embodiments, the antenna switching module 272 can perform any combination of the aforementioned pre-activation functions.

Referring again to FIG. 2, in various embodiments, the wireless device 110 may further modify the media stream and/or other device parameters after switching antennas. The wireless device 110 may modify the media stream, for example, to further reduce any potential packet loss or visual degradation after the transition to a new network route.

In one embodiment, the wireless device 110 can apply error resilient techniques to an audio, video, and/or other data stream. For example, the wireless device 110 can apply forward error correction (FEC) algorithms to the communications. In another embodiment, the wireless device 110 can adjust the media data rate based on the determined route quality for the new network route and/or antenna configuration. For example, if the new network route includes a higher bandwidth channel than the old network route, the wireless device 110 can increase the bit rate of the media stream.

In another embodiment, the wireless device 110 can send one or more refresh signals to audio and/or video generators. This may, for example, cause the audio and/or video generators to insert additional intraframes (I-frames), Long-Term Reference Pictures (LTRP), etc. into the media stream.

In another embodiment, the wireless device 110 can continue to transmit over the old antenna for a period of time. Accordingly, the wireless device 110 may transmit duplicate data over two antennas and/or radios for the overlapping time period.

In another embodiment, the antenna switching module 272 can be configured with a cool-down period. The cool-down period can be a period of time after switching to a new antenna and/or network route, during which the antenna switching module 272 will not switch antennas and/or network routes again. The cool-down period can be pre-set or dynamic. For example, the cool-down period can increase each time the wireless device 110 switches antennas and/or network routes, subject to a time-decay factor over which the cool-down period will fade back to an initial value.

Although the foregoing description discusses network route selection primarily in terms of antenna selection, the present disclosure can be applied to the monitoring and selection of any aspect of the network route including, but not limited to, radios, other wireless communication interfaces, wired communication interfaces, routers, switches, etc. For example, the "antenna" switching module 272 described above with respect to FIG. 3 can function as a "channel" switching module. In an embodiment, the channel switching module can measure the route quality indicators associated with one or more communication channels, and selecting a new channel. Channels can include, for example, cellular or WiFi channels.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of videoconferencing in a wireless network, the method comprising:
    determining at least one route quality indicator of a videoconference session for each of a plurality of communication routes between a wireless device and a remote system, each communication route being associated with at least one of a plurality of antennas;
    selecting an antenna based on the one or more route quality indicators;
    determining a transition time based on an entropy of videoconference audio and/or video data and transitioning to the selected antenna after the transition time; and
    transmitting, from the wireless device to the remote system, the videoconference audio and/or video data via the selected antenna.

2. The method of claim 1, wherein the at least one route quality indicator comprises at least one of: a network statistic, a radio performance metric, a user performance metric, and a predictive performance metric.

3. The method of claim 2, wherein the network statistic comprises at least one of: a one-way network latency, a round-trip time, a packet loss pattern, an available bandwidth, an end-to-end network latency, an end-to-end packet loss, and a jitter.

4. The method of claim 2, wherein the radio performance metric comprises at least one of: a Signal-to-Noise Ratio (SNR), a transmit power level, and a Received Signal Strength Indication (RSSI).

5. The method of claim 2, wherein the user performance metric comprises at least one of: a thermal metric, a power consumption rate, a CPU load, a buffer occupancy, a media playback state, a media playback configuration, and a user communication route preference.

6. The method of claim 1, wherein selecting the antenna comprises selecting an antenna associated with the non-selected communication route, when the one or more route quality indicators for the selected communication route are below a threshold.

7. The method of claim 6, wherein the threshold is based on the one or more route quality indicators for the selected communication route.

8. The method of claim 1, further comprising determining an entropy value for a portion of the video or audio data and transitioning to the selected antenna when the entropy is below a threshold.

9. A wireless device configured to perform videoconferencing in a wireless network, the wireless device comprising:
a plurality of antennas;
a network quality module configured determine at least one route quality indicator of a videoconference session for each of a plurality of communication routes between the wireless device and a remote system, each communication route being associated with at least one of the plurality of antennas;
an antenna switching module configured to select an antenna based on the one or more route quality indicators, wherein the switching module is further configured to determine a transition time based on an entropy of videoconference audio and/or video data and transitioning to the selected antenna after the transition time; and
a transmitter configured to transmit, from the wireless device to the remote system, the videoconference audio and/or video data via the selected antenna.

10. The wireless device of claim 9, wherein the at least one route quality indicator comprises at least one of: a network statistic, a radio performance metric, a user performance metric, and a predictive performance metric.

11. The wireless device of claim 10, wherein the network statistic comprises at least one of: an end-to-end network latency, an end-to-end packet loss, and a jitter.

12. The wireless device of claim 10, wherein the radio performance metric comprises at least one of: a Signal-to-Noise Ratio (SNR), a transmit power level, and a Received Signal Strength Indication (RSSI).

13. The wireless device of claim 10, wherein the user performance metric comprises at least one of: a CPU load, a buffer occupancy, a media playback state, a media playback configuration, and a user communication route preference.

14. The wireless device of claim 9, wherein the network quality module is configured to determine an entropy value for a portion of the video or audio data.

15. An apparatus for videoconferencing in a wireless network, the apparatus comprising:
means for determining at least one route quality indicator of a videoconference session for each of a plurality of communication routes between a wireless device and a remote system, each communication route being associated with at least one of a plurality of antennas;
means for selecting an antenna based on the one or more route quality indicators;
means for determining a transition time based on an entropy of videoconference audio and/or video data and transitioning to an antenna selected by the means for selecting after the transition time; and
means for transmitting, from the wireless device to the remote system, the videoconference audio and/or video data via the selected antenna.

16. The apparatus of claim 15, wherein the means for selecting the antenna comprises means for selecting an antenna associated with the non-selected communication route, when the one or more route quality indicators for the selected communication route are below a threshold.

17. A non-transitory computer-readable medium comprising code that, when executed by one or more processors, causes an apparatus to:
determine at least one route quality indicator of a videoconference session for each of a plurality of communication routes between a wireless device and a remote system, each communication route being associated with at least one of a plurality of antennas;
select an antenna based on the one or more route quality indicators;
determine a transition time based on an entropy of videoconference audio and/or video data and transitioning to the selected antenna after the transition time; and
transmit, from the wireless device to the remote system, the videoconference audio and/or video data via the selected antenna.

18. The medium of claim 17, wherein the at least one route quality indicator comprises at least one of: a network statistic, a radio performance metric, a user performance metric, and a predictive performance metric.

19. The medium of claim 18, wherein the network statistic comprises at least one of: an end-to-end network latency, an end-to-end packet loss, and a jitter.

20. The medium of claim 18, wherein the radio performance metric comprises at least one of: a Signal-to-Noise Ratio (SNR), a transmit power level, and a Received Signal Strength Indication (RSSI).

* * * * *